US010920866B2

(12) United States Patent
Gostin, Jr. et al.

(10) Patent No.: US 10,920,866 B2
(45) Date of Patent: Feb. 16, 2021

(54) VEHICLE DRIVELINE COMPONENT WITH LATCHING ACTUATOR

(71) Applicant: AMERICAN AXLE & MANUFACTURING, INC., Detroit, MI (US)

(72) Inventors: Edgar B. Gostin, Jr., Sterling Heights, MI (US); Neil R. Maurer, Sterling Heights, MI (US); Joseph S. Balenda, II, Grand Blanc, MI (US); Ronald P. Silye, Livonia, MI (US); Kenneth E. Gutelius, Lake Orion, MI (US); Adam Veldhuis, Windsor (CA)

(73) Assignee: American Axle & Manufacturing, Inc., Detroit, MI (US)

( * ) Notice: Subject to any disclaimer, the term of this patent is extended or adjusted under 35 U.S.C. 154(b) by 91 days.

(21) Appl. No.: 15/996,633

(22) Filed: Jun. 4, 2018

(65) Prior Publication Data

US 2019/0368592 A1 Dec. 5, 2019

(51) Int. Cl.
| | |
|---|---|
| *F16H 48/24* | (2006.01) |
| *B60K 23/08* | (2006.01) |
| *F16H 48/08* | (2006.01) |
| *F16D 11/14* | (2006.01) |
| *F16D 27/118* | (2006.01) |
| *F16H 48/34* | (2012.01) |

(52) U.S. Cl.
CPC ............ *F16H 48/24* (2013.01); *B60K 23/08* (2013.01); *F16D 11/14* (2013.01); *F16D 27/118* (2013.01); *F16H 48/08* (2013.01); *F16H 48/34* (2013.01); *F16H 2048/346* (2013.01)

(58) Field of Classification Search
CPC ........ F16D 11/14; F16D 27/118; F16D 27/14; F16D 28/00; F16D 2121/18; F16H 48/24; F16H 48/34; F16H 2048/346; B60K 23/08
USPC .................................................. 475/223, 231
See application file for complete search history.

(56) References Cited

U.S. PATENT DOCUMENTS

| | | | |
|---|---|---|---|
| 4,327,344 A | 4/1982 | Luckenbach | |
| 5,867,092 A | 2/1999 | Vogt | |
| 5,980,415 A | 11/1999 | Showalter | |
| 7,744,500 B2 | 6/2010 | Donofrio et al. | |
| 7,775,928 B2 * | 8/2010 | Zink ...................... | B60K 17/16 475/230 |
| 8,047,323 B2 | 11/2011 | Downs et al. | |
| 9,162,567 B2 | 10/2015 | Valente et al. | |
| 9,347,503 B2 | 5/2016 | Gilmore | |
| 2001/0014027 A1 | 8/2001 | Mori et al. | |
| 2007/0179008 A1 * | 8/2007 | Fusegi ................... | F16H 48/08 475/231 |

(Continued)

*Primary Examiner* — Roger L Pang
(74) *Attorney, Agent, or Firm* — Burris Law, PLLC (57) ABSTRACT

A vehicle driveline component that employs a latching actuator to toggle between a first operation mode and a second operational mode. The latching actuator includes first and second actuator structures, a biasing spring, which biases the second actuator structure away from the first actuator structure, a linear motor, which can be operated to drive the second actuator structure toward the first actuator structure, and a plurality of linkages that cooperate with the biasing spring to releasably lock the second actuator structure relative to the first actuator structure in each of an extended position and a retracted position.

20 Claims, 12 Drawing Sheets

(56) References Cited

U.S. PATENT DOCUMENTS

| | | | |
|---|---|---|---|
| 2008/0122436 A1* | 5/2008 | Pinkos | B60K 17/16 |
| | | | 324/207.21 |
| 2014/0240066 A1 | 8/2014 | Gerovac | |
| 2015/0260239 A1* | 9/2015 | Hayakawa | F16D 27/118 |
| | | | 192/84.1 |
| 2015/0337913 A1* | 11/2015 | Takaira | F16D 27/118 |
| | | | 192/84.1 |
| 2017/0009819 A1* | 1/2017 | Qin | F16D 13/76 |
| 2018/0306297 A1* | 10/2018 | Komatsu | F16H 48/34 |
| 2019/0032762 A1* | 1/2019 | Yoshisaka | F16H 48/40 |
| 2019/0136952 A1* | 5/2019 | Garcia | F16H 48/34 |
| 2019/0226566 A1* | 7/2019 | Hillman | B60K 17/16 |

\* cited by examiner

VEHICLE DRIVELINE COMPONENT WITH LATCHING ACTUATOR

FIELD

The present disclosure relates to a vehicle driveline component with a latching actuator.

BACKGROUND

This section provides background information related to the present disclosure which is not necessarily prior art.

Various types of vehicle driveline components employ actuators for translating a movable member to selectively operate the vehicle in different operational modes. For example, front axle assemblies in drivelines having four-wheel drive capabilities frequently have an actuator for selectively coupling an output of a front differential assembly to a stub shaft to permit a drive connection between the front differential and a front wheel to be decoupled when the vehicle driveline is to be operated in a rear wheel drive mode. Rear axle assemblies can have actuators that permit decoupling of a propshaft from an input pinion gear, or for decoupling an output of a rear differential assembly from a stub shaft to permit a drive connection between the propshaft and a rear wheel to be decoupled when the vehicle is to be operated in a front wheel drive mode. Power take-off units used in all-wheel drive drivelines can employ an actuator for selectively decoupling the input from the power take-off unit to the output of the power take-off unit. Many vehicle driveline components, such as power take-off units and transfer cases, employ an actuator for selectively translating an element of a two-speed reduction gearset between a high range position and a low range position. Differential assemblies of all types can be equipped with an actuator that operates a coupling or clutch to cause the differential assembly to operate in mode that inhibits speed differentiation between the two differential outputs. Typically, these actuators are one-way actuators having a spring return. In this regard, an actuator spring return biases an output of the actuator into a predetermined condition, and power (either electrical energy or fluid pressure) is applied to the actuator to cause the actuator output to move into a second predetermined condition. While such actuator devices are suited for their intended purpose, we have noted that it would be advantageous in many situations if the output of the actuator could be toggled between the two conditions without the need to maintain power on the actuator.

SUMMARY

This section provides a general summary of the disclosure, and is not a comprehensive disclosure of its full scope or all of its features.

In one form, the present disclosure provides a vehicle driveline component with an actuator. The actuator has a first actuator structure, a second actuator structure, a biasing spring, a linear motor and a plurality of linkages. The second actuator structure is movable relative to the first actuator structure along a movement axis. The biasing spring biases the second actuator structure away from the first actuator structure along the movement axis. The linear motor is selectively operable to urge the second actuator structure toward the first actuator structure. The plurality of linkages couple the second actuator structure to the first actuator structure for movement of the second actuator structure relative to the first actuator structure between a first actuator position, in which the second actuator structure is spaced apart from the first actuator structure along the movement axis by a first distance, and a second actuator position in which the second actuator structure is spaced apart from the first actuator structure along the movement axis by a second distance that is greater than the first distance. The linkages cooperate with the biasing spring to releasably lock the second actuator structure in each of the first and second actuator positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
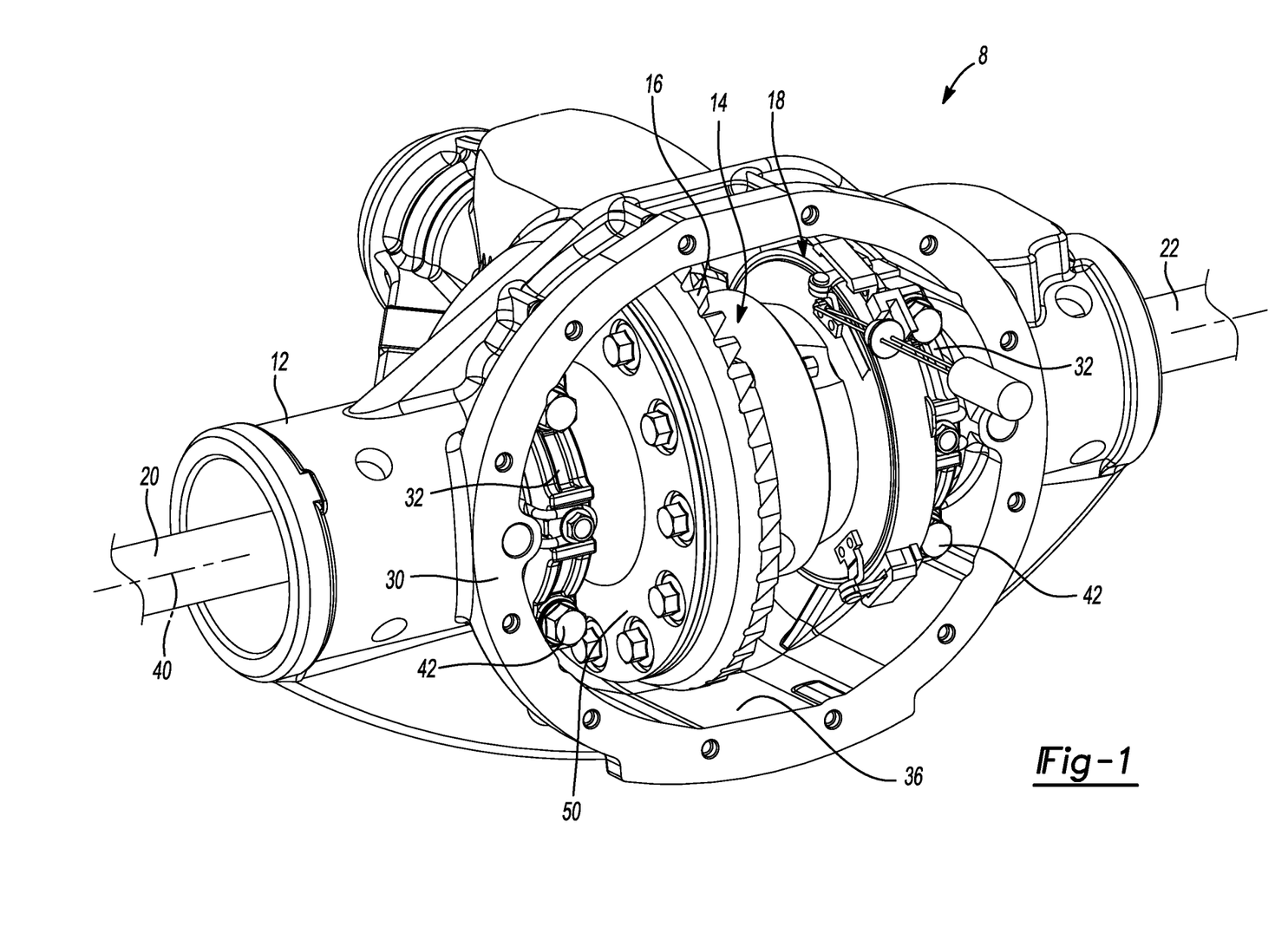
FIG. 1 is a perspective view of a portion of a vehicle driveline component constructed in accordance with the teachings of the present disclosure.
Figure 2:
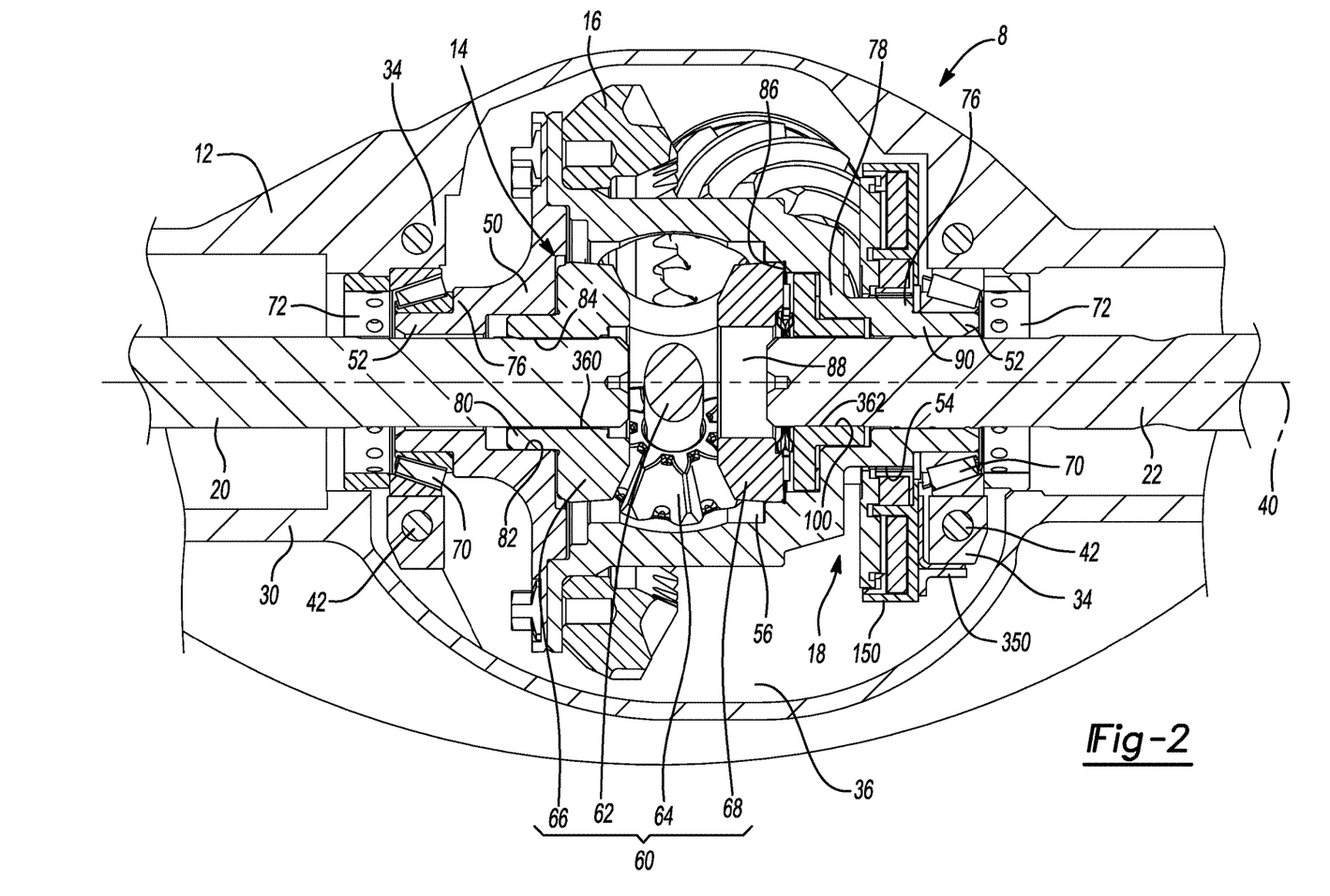
FIG. 2 is a cross-sectional view of the vehicle driveline component of FIG. 1.

With reference to FIGS. 1 and 2, an exemplary vehicle driveline component constructed in accordance with the teachings of the present disclosure is generally indicated by reference numeral 8. In the example provided, the vehicle driveline component 8 is an axle assembly, but it will be appreciated that the teachings of the present disclosure have application to various other vehicle driveline components. The vehicle driveline component 8 can include an axle housing 12, a differential assembly 14, a ring gear 16, an axle disconnect mechanism 18 and first and second axle shafts 20 and 22, respectively. The axle housing 12, which is only partly shown, includes a carrier housing 30 and a pair of bearing caps 32. The carrier housing defines a pair of bearing bulkheads 34 and a cavity 36 into which the differential assembly 14, the ring gear 16 and the axle disconnect mechanism 18 are received. The bearing bulkheads 34 are spaced apart from one another along a differential axis 40. Each of the bearing caps 32 can be mounted to a corresponding one of the bearing bulkheads 34 and fixedly coupled thereto via a plurality of bolts 42.

With specific reference to FIG. 2, the differential assembly 14 can comprise any means for permitting speed differentiation between the first and second axle shafts 20 and 22, such as one or more friction clutches (not shown), or a differential gearset. The differential assembly 14 can have a differential input 50 that can be fixedly coupled to ring gear 16 and supported for rotation relative to the axle housing 12 about the differential axis 40. In the example provided, the differential input 50 is a differential case that defines a pair of trunnions 52, an actuator mounting surface 54 and a gearset cavity 56, and the differential assembly 14 includes a differential gearset 60 having a cross-pin 62, a plurality of differential pinions 64 and first and second side gears 66 and 68, respectively. A pair of tapered roller bearings 70 support the differential input 50 relative to the axle housing 12. Each of the tapered roller bearings 70 is received on an associated one of the trunnions 52, as well as between an associated one of the bearing bulkheads 34 and a related one of the bearing caps 32 (FIG. 1). Annular bearing adjusters 72 can be employed to secure the tapered roller bearings 70 in the axle housing 12, as well as preload the tapered roller bearings 70. In this regard, each of the bearing adjusters 72 is threaded into the axle housing 12, abuts an outer bearing race of an associated one of the tapered roller bearings 70 and applies a force to the tapered roller bearing 70 that is transmitted through an inner bearing race of the tapered roller bearing 70 to a first shoulder 76 formed on the differential input 50. The actuator mounting surface 54 can be a circumferentially extending surface that is disposed concentrically about the differential axis 40 at a location along the differential axis 40 between one of the first shoulders 76 and a second shoulder 78 on the differential input 50.

The cross-pin 62 is mounted to the differential input 50 for rotation therewith about the differential axis 40 in a manner that intersects the differential axis 40, for example at a right angle. Each of the differential pinions 64 is received in the gearset cavity 56 and is rotatably disposed on the cross-pin 62. The first and second side gears 66 and 68 are received in the gearset cavity 56 where they are rotatable about the differential axis 40 and meshingly engaged to the differential pinions 64. The first side gear 66 includes a journal portion 80, which is received into a case bore 82 in the differential input 50, and an internally splined bore 84. The case bore 82 and the journal portion 80 cooperate to permit the first side gear 66 to thrust along the differential axis 40 while maintaining a rotational axis of the first side gear 66 in alignment with the differential axis 40. The second side gear 68 is received into a counterbore 86 formed in the differential input 50 and defines a central bore 88.

Figure 3:
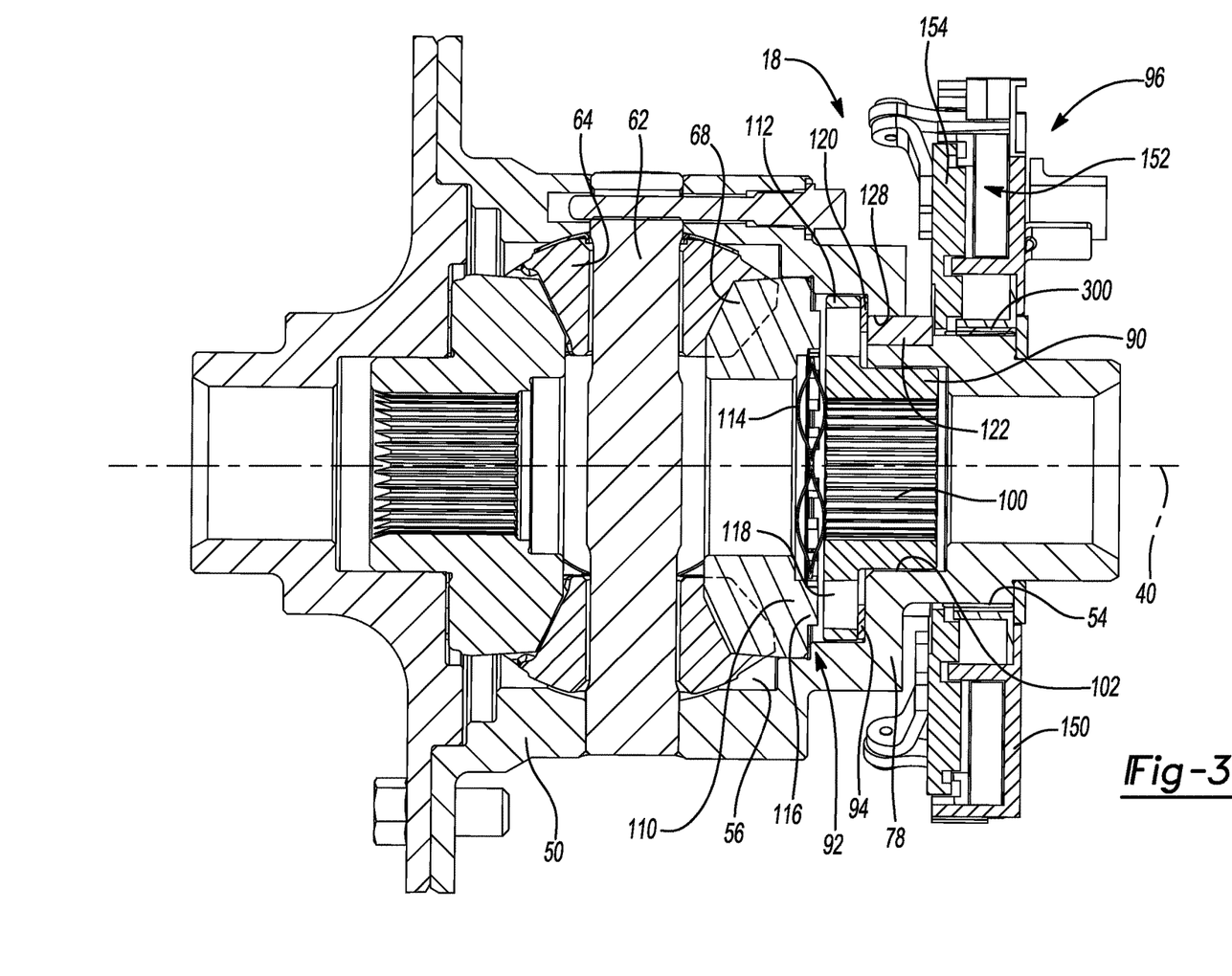
FIG. 3 is a cross-sectional view of a portion of the vehicle driveline component of FIG. 1 illustrating a differential assembly and an axle disconnect mechanism in more detail.

In FIG. 3, the axle disconnect mechanism 18 can include an output member 90, a coupling or clutch 92, a force plate 94 and an actuator 96. The output member 90 can have an internally splined bore 100 and can comprise a hollow-tubular structure that can be received into a case bore 102 in the differential input 50. The case bore 102 can cooperate with the output member 90 to permit the output member 90 to thrust along the differential axis 40 while maintaining a rotational axis of the output member 90 in alignment with the differential axis 40.

The coupling or clutch 92 can be any type of device for selectively permitting the transmission of rotary power between the second side gear 68 and the output member 90. In the example provided, the coupling or clutch 92 is a dog clutch having a first dog 110, which can be fixedly coupled to the second side gear 68, a second dog 112, which can be fixedly coupled to the output member 90, and a return spring 114. The first dog 110 can include a first set of engagement features, such as a plurality of teeth 116 that can be formed onto an annular, radially extending surface on the second side gear 68. The teeth 116 can be integrally and unitarily formed with the second side gear 68. The second dog 112 can include a second set of engagement features that can matingly engage the first set of engagement features. In the example provided, the second dog 112 is an annular flange that is fixedly coupled to the output member 90 (e.g., integrally and unitarily formed therewith) and the second set of engagement features comprises apertures 118 that are formed through the annular flange and configured to receive the teeth 116 of the first dog 110 therein. It will be appreciated, however, that the second set of engagement features could comprise a set of teeth. The second dog 112 is movable along a movement axis (i.e., the differential axis 40) between a first clutch position, in which the second set of engagement features are disengaged from the first set of engagement features, and a second clutch position in which the second set of engagement features are engaged with the first set of engagement features. It will be appreciated that the clutch 92 will not transmit rotary power between the second side gear 68 and the output member 90 when the second dog is in the first clutch position, but that the clutch 92 will transmit rotary power between the second side gear 68 and the output member 90 when the second dog 112 is in the second clutch position. The return spring 114 can be disposed axially between the first and second dogs 110 and 112 and can bias the second dog 112 toward the first clutch position.

Figure 4:
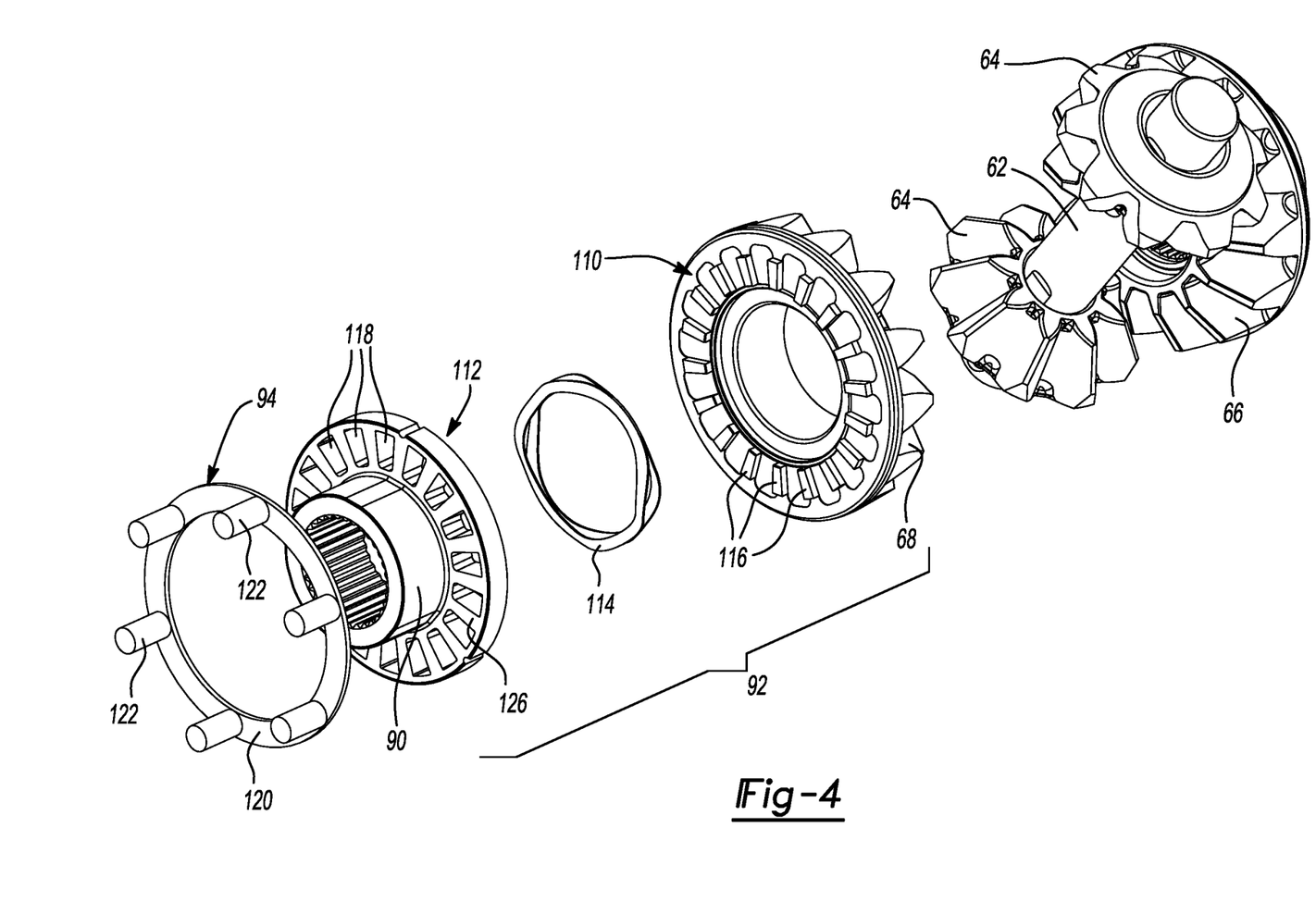
FIG. 4 is an exploded perspective view illustrating components of the differential assembly and the axle disconnect mechanism.

With reference to FIGS. 3 and 4, the force plate 94 can include an annular plate member 120 and a plurality of legs 122 that are fixedly coupled to the plate member 120. The force plate 94 can be received into the gearset cavity 56 between an annular surface 126 on the second dog 112 and the second shoulder 78 formed in the differential input 50. The legs 122 can extend from the plate member 120 through holes 128 formed in the second shoulder 78 of the differential input 50 and can abut the actuator 96. If desired, one or more thrust bearings could be employed, such as between the plate member 120 and the second dog 112, and/or between the legs 122 and the actuator 96.

With reference to FIGS. 5 through 8, the actuator 96 can have a first actuator structure 150, a linear motor 152, a second actuator structure 154, a biasing spring 156 and a plurality of linkages 158.

The first actuator structure 150 can be an annular container-like structure having an inner annular wall 160, an outer annular wall 162, and a radially extending wall member 164 that is disposed between the inner and outer annular walls 160 and 162 and which terminates radially inwardly of the inner annular wall 160.

The linear motor 152 can be housed in the first actuator structure 150 and can comprise any type of linear motor 152 that can be employed to translate the second actuator structure 154 along the movement axis (i.e., the differential axis 40), such as a pneumatic or hydraulic cylinder. In the particular example provided, the linear motor 152 is a solenoid that comprises an electromagnet coil 170 and an armature 172. The electromagnet coil 170 can be received into the first actuator structure 150 between the inner and outer annular walls 160 and 162 and can be fixedly coupled to the first actuator structure 150 in any desired manner, such as with a potting compound that adhesively couples the electromagnet coil 170 to the first actuator structure 150. In the example provided, the armature 172 and the second actuator structure 154 are integrally and unitarily formed as an annular disk, but it will be appreciated that the armature 172 and the second actuator structure 154 could be formed as separate components that could be assembled to one another.

Figure 7:
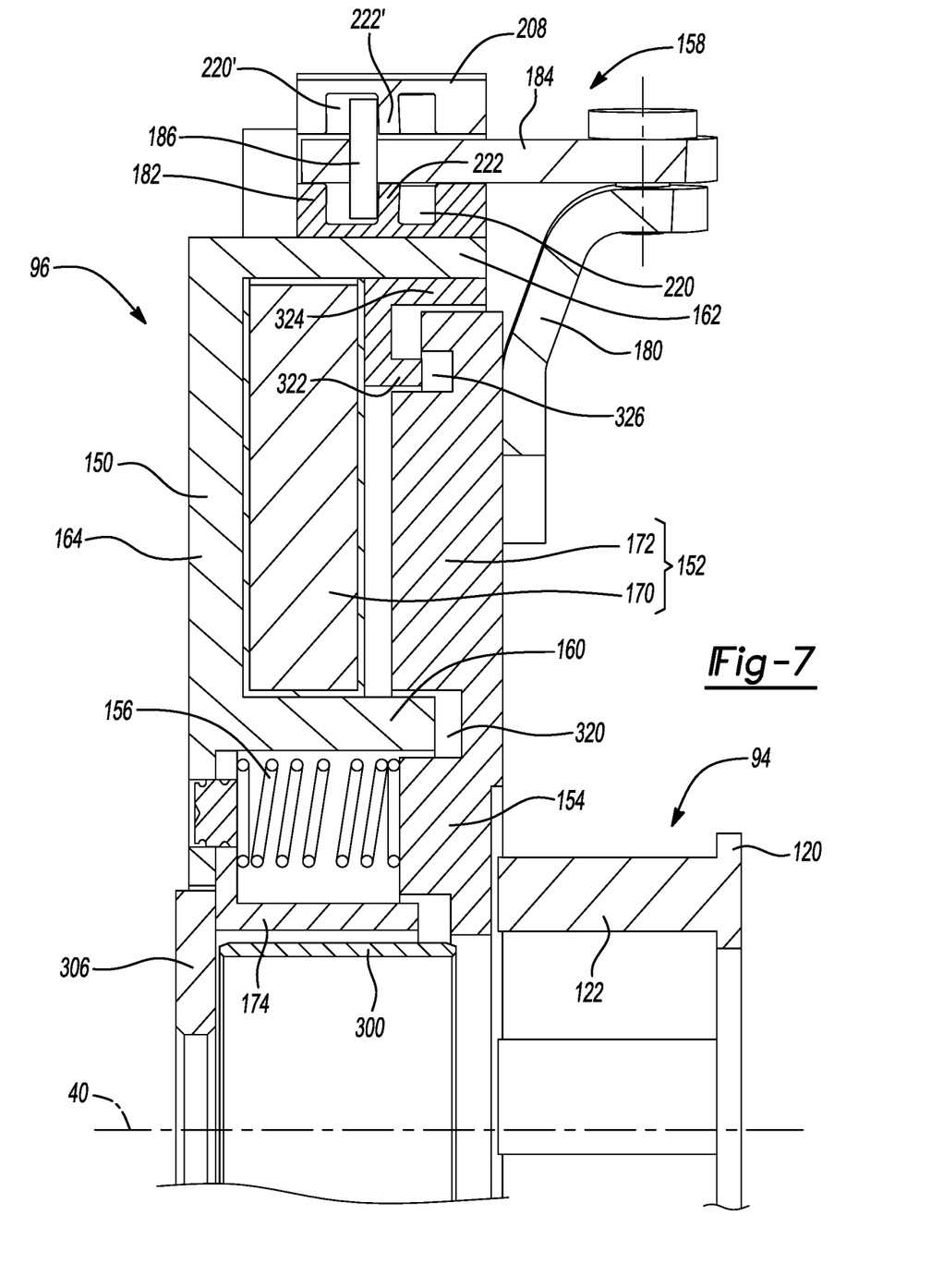
FIG. 7 is a cross-sectional view of the latching actuator.
Figure 8:
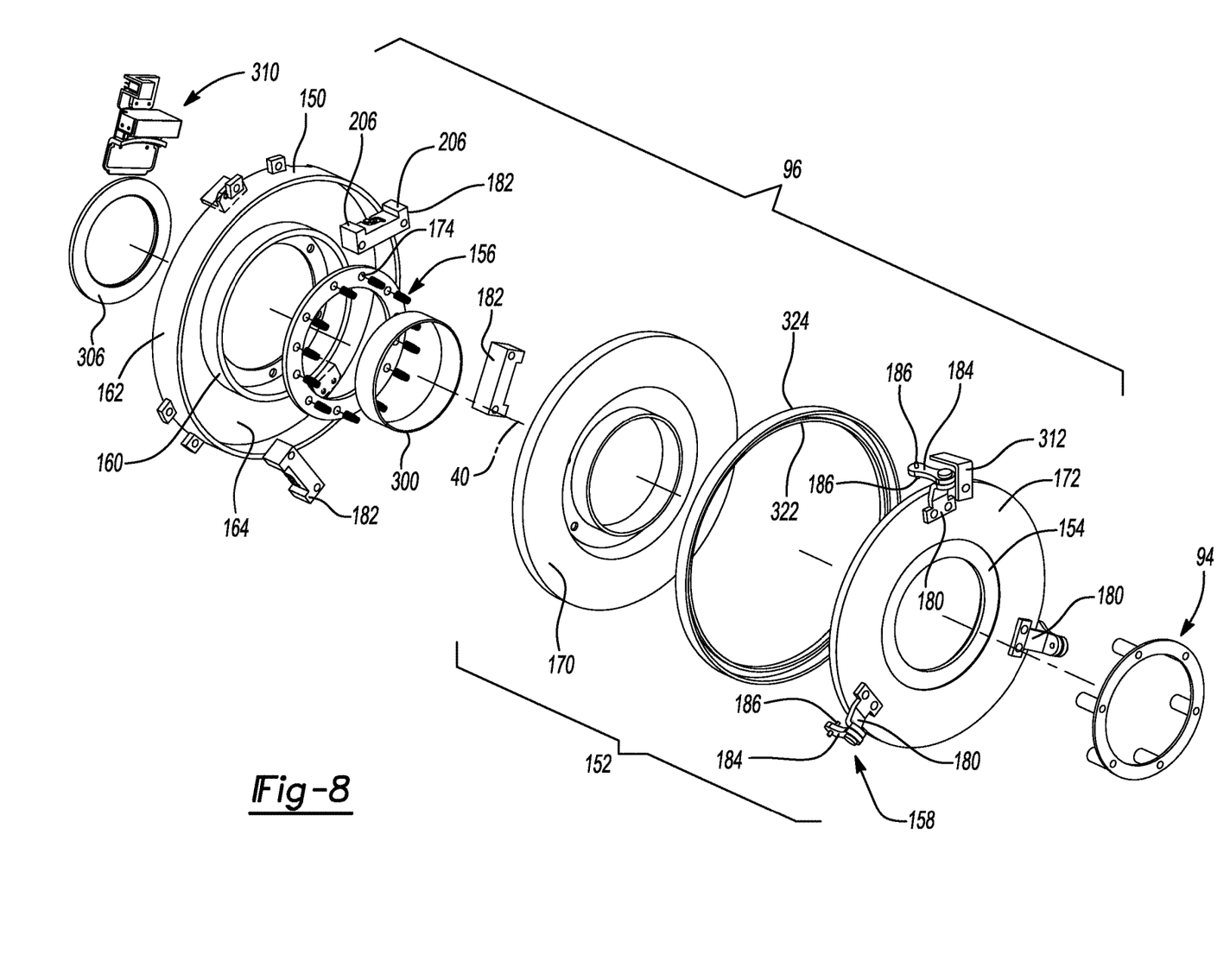
FIG. 8 is an exploded perspective view of the latching actuator.

The biasing spring 156 can be disposed between the first actuator structure 150 and the armature 172 and/or second actuator structure 154 to bias the second actuator structure 154 away from the first actuator structure 150. In the example provided, the biasing spring 156 comprises a plurality of helical compression springs that are spaced circumferentially about the differential axis 40, but it will be appreciated that the biasing spring 156 could be configured differently, such as in the form of a single helical compression spring or a wave spring. The biasing spring 156 can be abutted against the first actuator structure 150 (e.g., the portion of the radially extending wall member 164 that extends radially inward of the inner annular wall 160. If desired, the biasing spring 156 can be mounted onto a spring seat 174 that can be fixedly coupled to the first actuator structure 150.

The linkages 158 can couple the second actuator structure 154 to the first actuator structure 150 in a manner that permits the second actuator structure 154 to be moved along the differential axis 40 relative to the first actuator structure 150 between a first actuator position, in which the second actuator structure 154 is spaced apart from the first actuator structure 150 along the movement axis (differential axis 40) by a first distance, and a second actuator position in which the second actuator structure 154 is spaced apart from the first actuator structure 150 along the movement axis by a second distance that is greater than the first distance. Moreover, the linkages 158 are configured to cooperate with the biasing spring 156 to releasably lock the second actuator structure 154 in each of the first and second actuator positions.

Each of the linkages 158 can comprise a fixed link 180, a link guide track 182, a pivot link 184 and a guide member 186. In the example provided, each of the fixed links 180 is fixedly coupled to the second actuator structure 154 while each of the link guide tracks 182 is fixedly coupled to the first actuator structure 150. It will be appreciated, however, that some or all of the fixed links 180 could be fixedly coupled to the first actuator structure 150 and that some or all of the link guide tracks 182 could be fixedly coupled to the second actuator structure 154 in the alternative.

Figure 9:
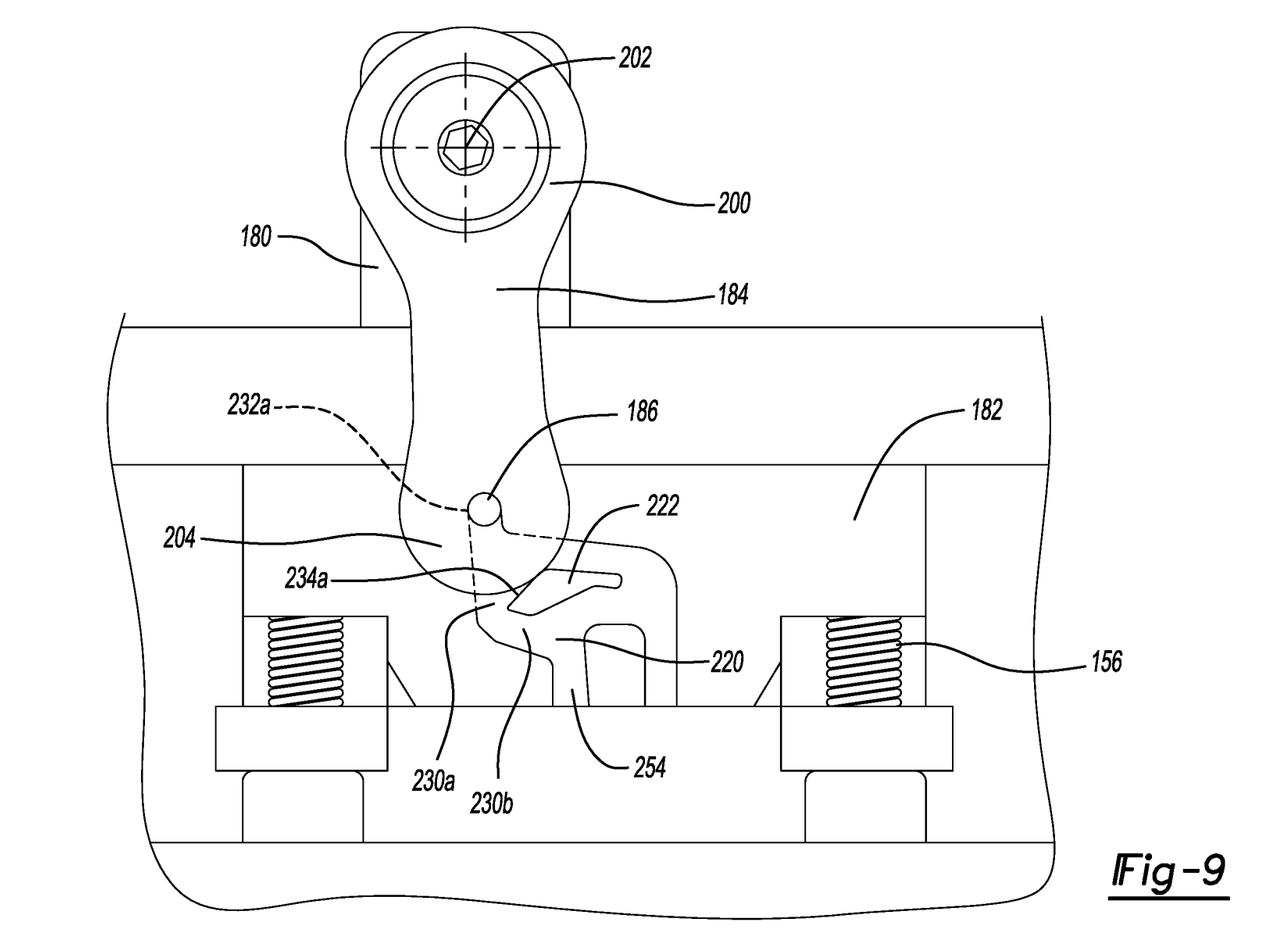
FIG. 9 is a plan view of a portion of the latching actuator, illustrating a guide member positioned in a first track position.

With reference to FIG. 9, the pivot link 184 can have a first end 200, which is pivotally coupled to the fixed link 180 about a pivot axis 202, and a second end 204 onto which the guide member 186 can be mounted. The guide member 186, which can comprise a pin, can be engaged to the link guide track 182.

Figure 5:
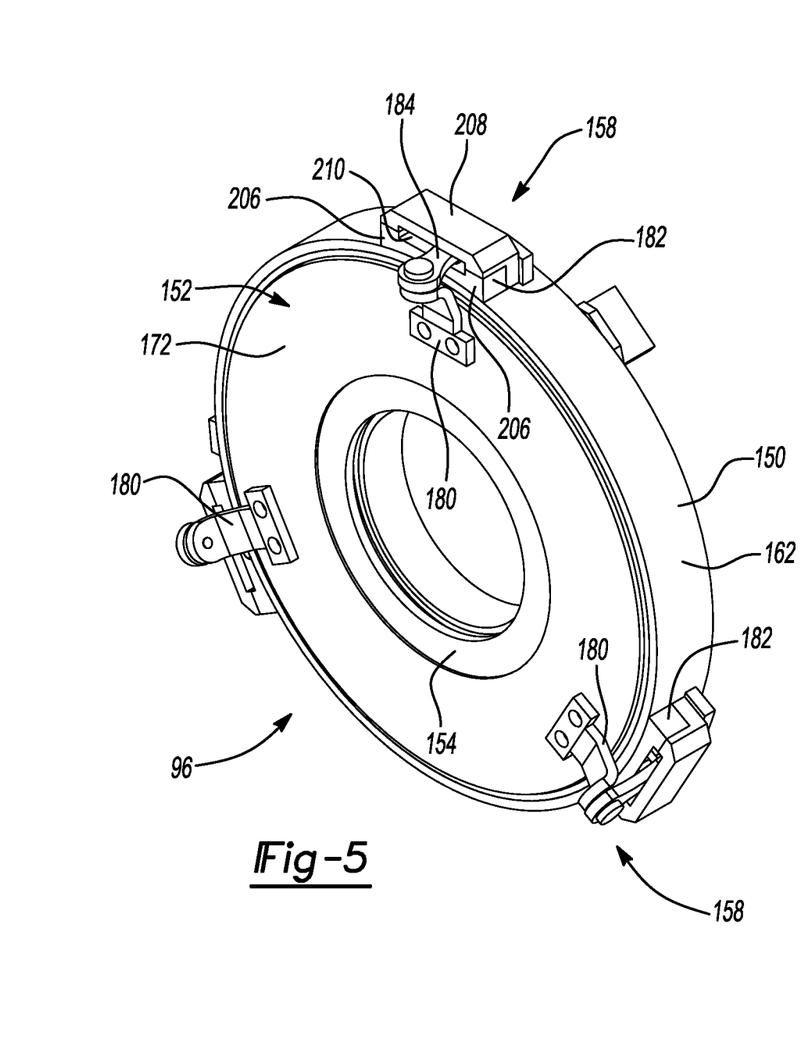
FIGS. 5 and 6 are front and rear perspective views, respectively of a portion of the axle disconnect mechanism, illustrating a latching actuator in more detail.

In FIG. 5, the link guide track 182 can be configured to restrict motion of the pivot link 184 to ensure that the linkages 158 operate in their intended manner and/or to prevent the guide member 186 (FIG. 8) from disengaging the link guide track 182. In the example provided, the link guide track 182 has a pair of walls 206 that cooperate with a cover 208 to form a space 210 into which the pivot link 184 is received.

Figure 10:
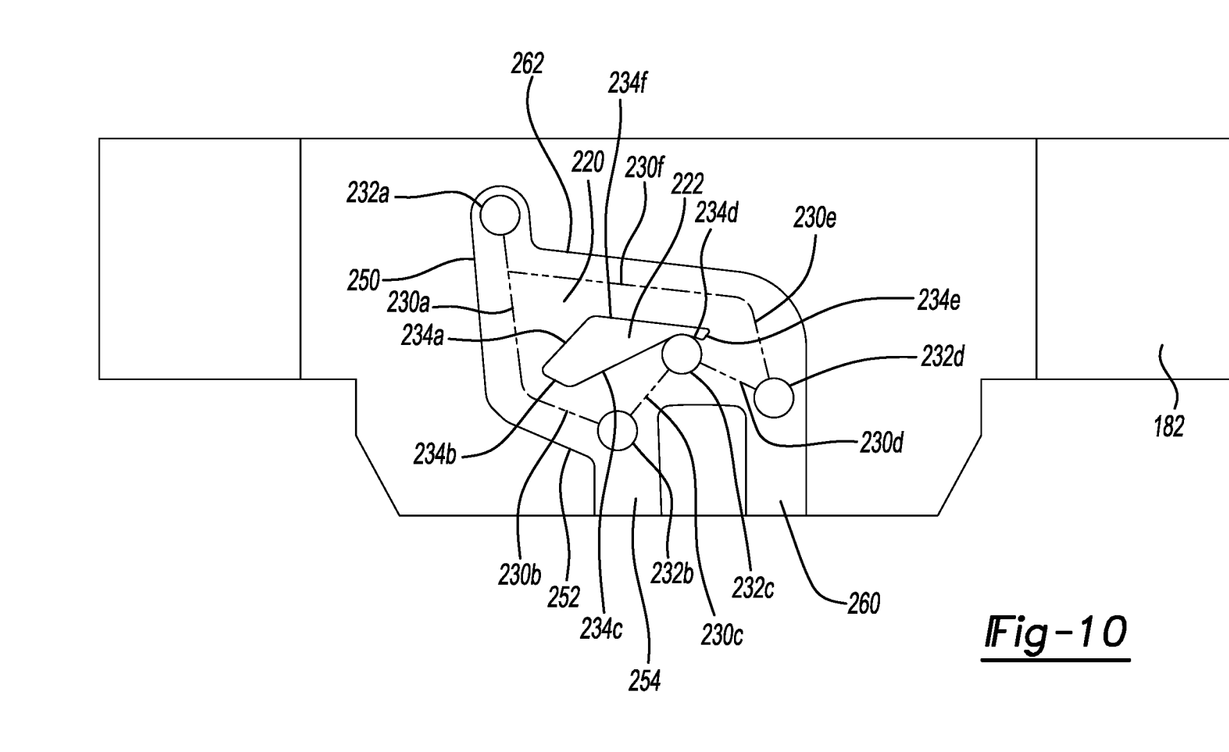
FIG. 10 is a plan view of a portion of the latching actuator illustrating a link guide track in more detail.

With reference to FIGS. 9 and 10, the link guide track 182 can define a groove or track 220 that is disposed about a guide projection 222. The groove 220 and the guide projection 222 can cooperate with the guide member 186 to cause movement of the second end 204 of the pivot link 184 in a predetermined manner. If desired, the cover 208 could form a similar groove or track 220' and guide projection 222' and the guide member 186 can extend into the groove 220' in the cover 208 as shown in FIG. 7. In the example provided, the groove 220 is formed of a plurality of track segments 230a, 230b, 230c, 230d, 230e and 230f and defines a plurality of track locations 232a, 232b, 232c and 232d. The track location 232a is formed on a first end of the track segment 230a. The track segment 230b has a first end, which intersects a second end of the track segment 230a, and a second end that terminates at the track location 232b. The track segment 230c extends between the track locations 232b and 232c. The track segment 230d extends between the track locations 232c and 232d. The track segment 230d has a first end at the track location 232d and a second end that intersects a first end of the track segment 230e. The track segment 230e has a second end that terminates at a first end of track segment 230f. The track segment 230f intersects the track segment 230a. The guide projection 222 can have a plurality of guide surfaces 234a, 234b, 234c, 234d, 234e and 234f.

Returning to FIGS. 8 and 9, the guide members 186 can be located at the track location 232a in their respective link guide tracks 182, the biasing spring 156 can position the second actuator structure 154 in the second actuator position. It will be appreciated that contact between the guide members 186 and the first end of the track segment 230a can inhibit movement of the second actuator structure 154 along the differential axis 40 in a direction away from the first actuator structure 150 past the second actuator position.

Figure 11:
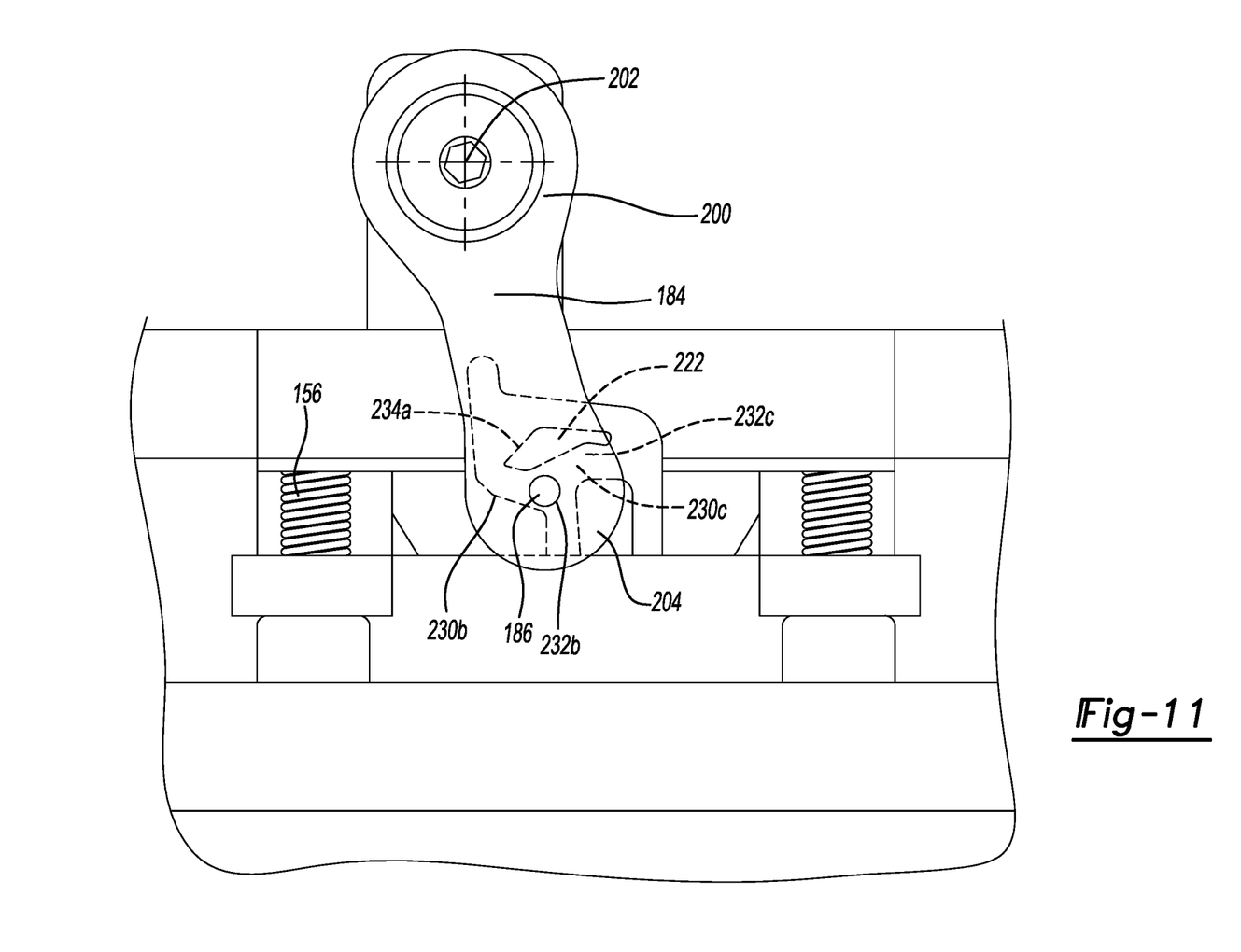
FIG. 11 is a plan view similar to that of FIG. 9 but depicting the guide member positioned in a second track position.

With additional reference to FIG. 11, the linear motor 152 can be operated to drive the second actuator structure 154/armature 172 along the differential axis 40 toward the first actuator structure 150. In the example provided, electric power is provided to the electromagnet coil 170 to drive the armature 172 toward the first actuator structure 150. The second actuator structure 154 and the fixed links 180 can travel with the armature 172, causing corresponding movement of the pivot links 184. This movement of the pivot links 184 can cause the guide members 186 to travel along the track segments 230a and into the track segments 230b. The guide surface 234a on each guide projection 222 cooperates with opposite wall 250 (FIG. 10) of the track segment 230a of an associated groove 220 to form a "funnel" that can direct an associated guide member 186 against a wall 252 (FIG. 10) of the track segment 230b. Each of the track segments 230b extends or slopes away from an associated one of the track segments 230a in a manner that causes the pivot links 184 to pivot about the pivot axes 202 such the guide members 186 rotate toward the track location 232c. If desired, each of the guide members 186 can define an overtravel groove 254 can intersect the track segment 230b and can receive an associated one of the guide members 186 if the stroke or travel of the linear motor 152 is large enough to drive the guide members 186 out of the track segments 230b.

With reference to FIGS. 8, and 10 through 12, the linear motor 152 can be operated thereafter to permit the biasing spring 156 to urge the second actuator structure 154 along the differential axis 40 away from the first actuator structure 150. In the example provided, electrical power to the electromagnet coil 170 is interrupted or halted. Movement of the second actuator structure 154 along the differential axis 40 away from the first actuator structure 150 caused by the biasing spring 156 causes corresponding movement of the fixed links 180 and the first ends 200 of the pivot links 184, and drives the guide members 186 into contact with the guide surfaces 234c on the guide projections 222. The guide surfaces 234c are shaped to guide the guide members 186 into the location (i.e., the track location 232c) where the guide surfaces 234c intersect the guide surfaces 234d. When the guide members 186 are located in the track location 232c, the second actuator structure 154 is disposed in the first actuator position.

With reference to FIGS. 8, 10, 12 and 13, the linear motor 152 can thereafter be operated to drive the second actuator structure 154/armature 172 along the differential axis 40 toward the first actuator structure 150. In the example provided, electric power is provided to the electromagnet coil 170 to drive the armature 172 toward the first actuator structure 150. The second actuator structure 154 and the fixed links 180 can travel with the armature 172, causing corresponding movement of the pivot links 184. This movement of the pivot links 184 can cause the guide members 186 to travel along the track segments 230d and into the track segments 230e. If desired, the track segments 230e can include an extended portion 260 that can receive an associated one of the guide members 186 if the stroke or travel of the linear motor 152 is large enough to drive the guide members 186 out of the track segments 230d.

Thereafter, the linear motor 152 can be operated to permit the biasing spring 156 to urge the second actuator structure 154 along the differential axis 40 away from the first actuator structure 150. In the example provided, electrical power to the electromagnet coil 170 is interrupted or halted. Movement of second actuator 96 along the differential axis 40 away from the first actuator structure 150 caused by the biasing spring 156 causes corresponding movement of the fixed links 180 and the second ends 204 of the pivot links 184, and drives the guide members 186 first along the track segments 230e, into contact with outer walls 262 (FIG. 10) of the track segments 230f and finally into the track segments 230a where the guide members 186 come to rest in track locations 232a. As noted above, the positioning of the guide members 186 in the track locations 232a correspondingly positions the second actuator structure 154 in the second actuator position.

Returning to FIGS. 3, 7 and 8, the actuator 96 can be received on the actuator mounting surface 54 on the differential input 50. A bearing or bushing 300 can be received between the actuator 96 and the actuator mounting surface 54 to permit relative rotation between the actuator 96 and the differential input 50. In the example provided, the bushing 300 is disposed between the spring seat 174 and the actuator mounting surface 54. A thrust washer 306 can be disposed between the actuator 96 and the outer bearing race of the tapered roller bearing 70 (FIG. 2) that supports the differential input 50 relative to the axle housing 12. A sensor 310 can be coupled to the first actuator structure 150 and can be employed to sense a sensor target 312 that is coupled to the second actuator structure 154 for movement therewith along the differential axis 40 and responsively generate a sensor signal that is indicative of a position of the second actuator structure 154. For example, the sensor 310 could be a Hall-effect sensor that senses the magnetic field of the sensor target 312, an eddy current sensor that senses an eddy current induced in the sensor target 312 or a type of linear variable displacement transducer that essentially senses the distance between the sensor 310 and the sensor target 312. Various elements can be incorporated into the actuator 96 to maintain the armature 172 centered about the differential axis 40. For example, the inner annular wall 160 can be received into a first annular groove 320 formed in the armature 172, and/or an annular projection 322 formed on an annular frame element 324 that abuts the electromagnet coil 170 on a side opposite the first actuator structure 150 can be received into a second annular groove 326 formed in the armature 172. The first annular groove 320 can cooperate with the inner annular wall 160.

Figure 6:
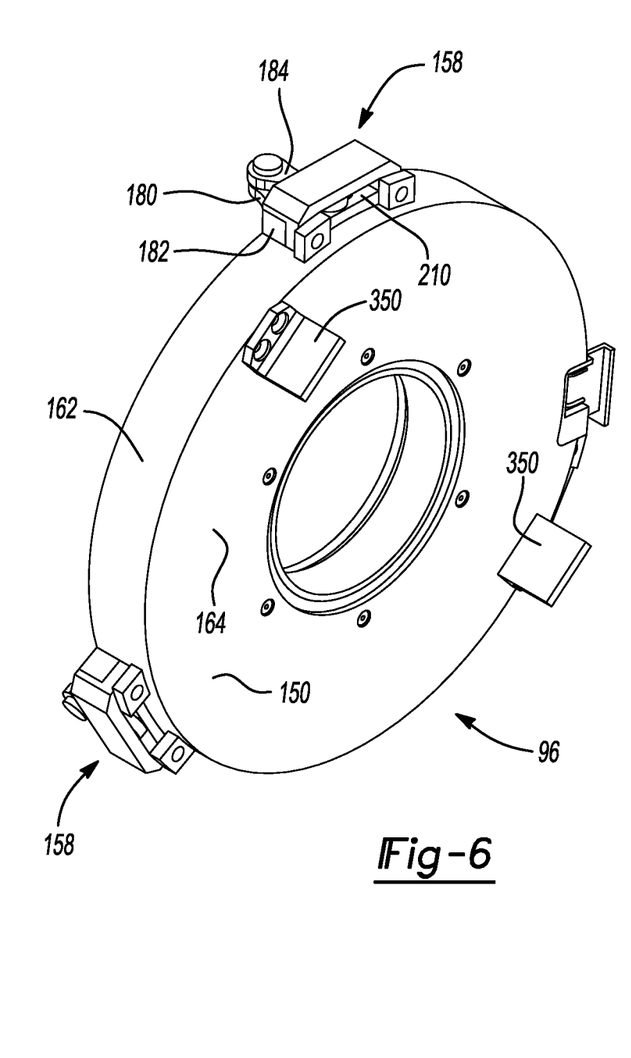

With reference to FIGS. 2 and 6, brackets 350 can be coupled to the first actuator structure 150 and abutted against the axle housing 12 to inhibit or limit rotation of the actuator 96 about the differential axis 40.

In FIG. 2, the first shaft 20 can have a male splined segment 360 that can be matingly engaged to the internally splined bore 84 in the first side gear 66 to thereby rotatably couple the first shaft 20 to the first side gear 66. The second shaft 22 can likewise have a male splined segment 362 that can be matingly engaged to the internally splined bore 100 in the output member 90 to thereby rotatably couple the second shaft 22 to the output member 90.

Figure 12:
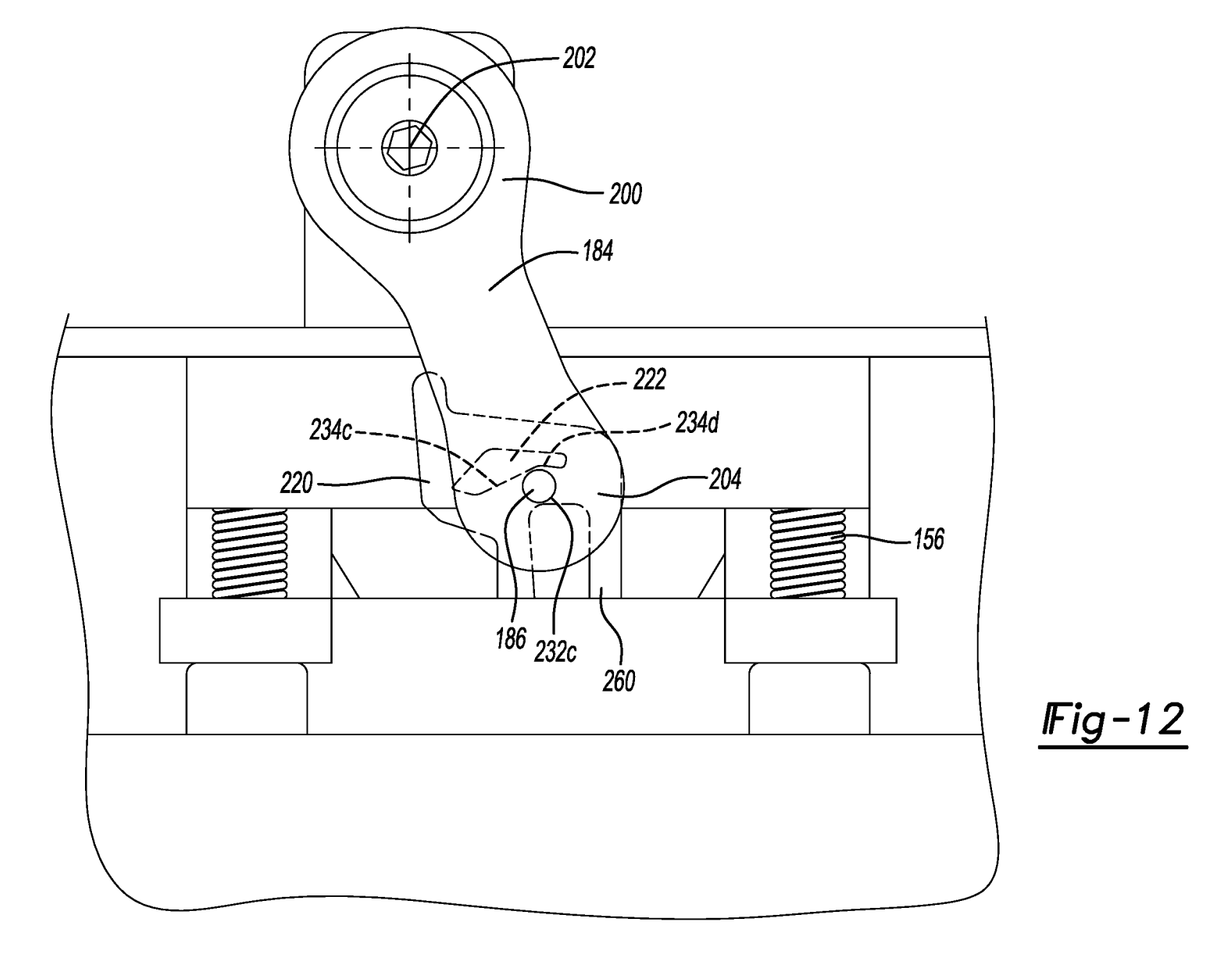
FIG. 12 is a plan view similar to that of FIG. 9 but depicting the guide member positioned in a third track position.
Figure 13:
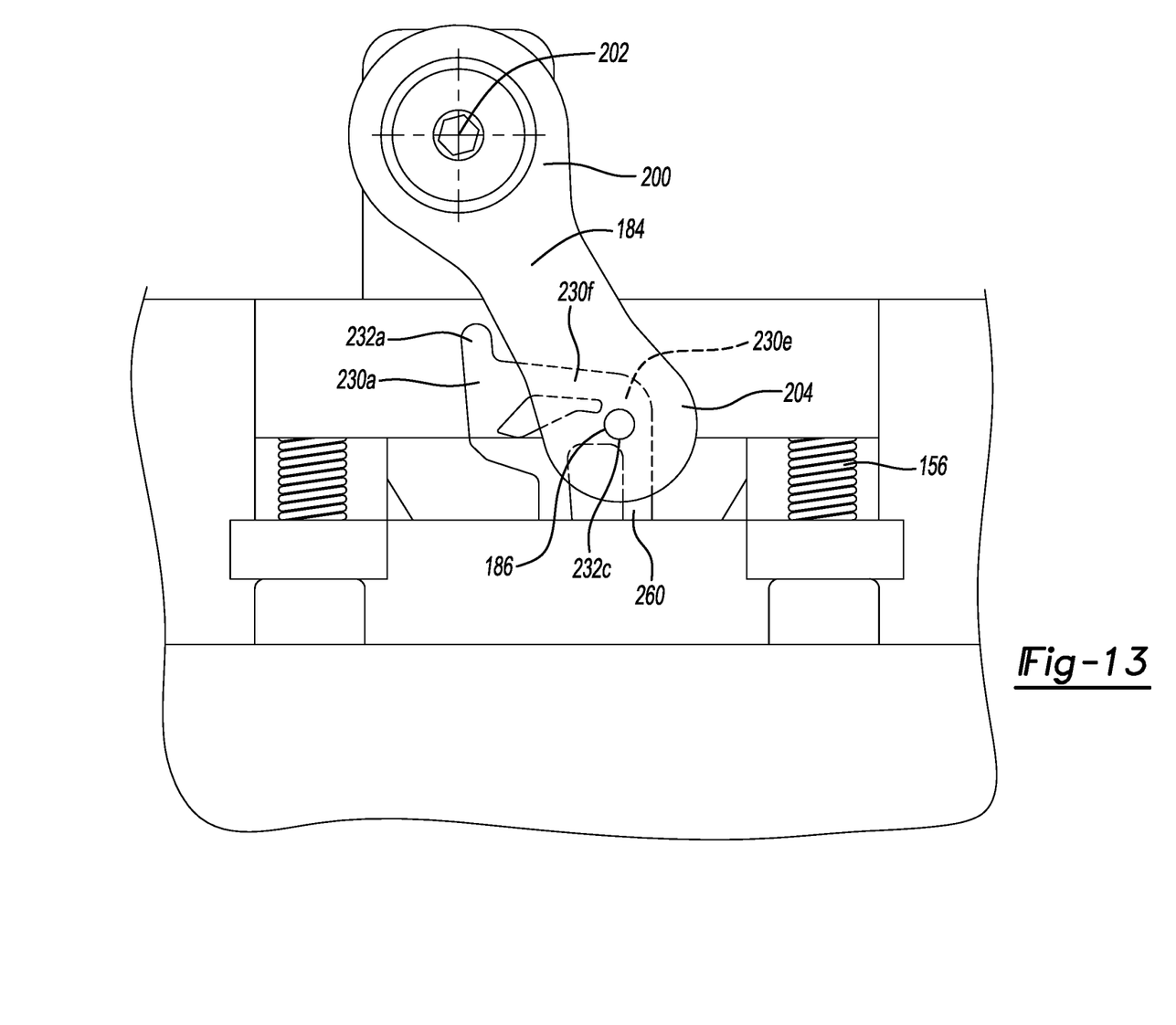
FIG. 13 is a plan view similar to that of FIG. 9, but depicting the guide member positioned in a fourth track position.

With reference to FIGS. 3, 9 and 12, the actuator 96 can be operated to selectively couple the second dog 112 to/decouple the second dog 112 from the first dog 110. In this regard, the actuator 96 can be operated as described above to locate the guide members 186 in the track locations 232c to position the second actuator structure 154 in the first actuator position, to permit the biasing spring 156 to urge the second dog 112 along the movement axis (i.e., the differential axis 40) into the first clutch position. As described above, placement of the second dog 112 in the first clutch position decouples the second set of engagement features (e.g., holes 118) on the second dog 112 from the first set of engagement features on the first dog 110 (e.g., teeth 116) so that rotary power is not transmitted through the clutch 92. The actuator 96 can also be operated as described above to locate the guide members 186 in the track locations 232a to position the second actuator structure 154 in the second actuator position to permit the second dog 112 to overcome the force of the biasing spring 156 and move along the movement axis into the second clutch position. As described above, placement of the second dog 112 in the second clutch position engages the second set of engagement features on the second dog 112 (e.g., holes 118) to the first set of engagement features on the first dog 110 (e.g., teeth 116) so that rotary power is transmitted through the clutch 92. Accordingly, it will be appreciated that the linear motor 152 of the actuator 96 can be selectively powered to toggle the actuator 96 between a retracted state and an extended state, and thereby toggle the clutch 92 between a decoupled state and an engaged state.

While the actuator 96 has been described in the context of an axle assembly 8 and for selectively inhibiting the transmission of rotary power between a differential output and a shaft, it will be appreciated that the invention, in its broader aspects, can be employed in numerous other vehicle driveline components. For example, the actuator could be substituted for the solenoid and fork that are employed to translate the collar in the front axle described in U.S. Pat. No. 7,775,928, the power take-off unit described in U.S. Pat. No. 8,047,323, the two-speed reduction associated with the power take-off unit described in U.S. Pat. No. 9,162,567, the two-speed reduction in the transfer case described in U.S.

Pat. No. 5,980,415, or the mode clutch in the transfer case described in U.S. Pat. No. 5,867,092, as well as for the actuator that is described in U.S. Pat. No. 7,744,500 for selectively locking a differential assembly.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle driveline component comprising:
an actuator having a first actuator structure, a second actuator structure, a biasing spring, a linear motor and a plurality of linkages, the second actuator structure being movable relative to the first actuator structure along a movement axis, the biasing spring biasing the second actuator structure away from the first actuator structure along the movement axis, the linear motor being selectively operable to urge the second actuator structure toward the first actuator structure, the plurality of linkages coupling the second actuator structure to the first actuator structure for movement of the second actuator structure relative to the first actuator structure between a first actuator position, in which the second actuator structure is spaced apart from the first actuator structure along the movement axis by a first distance, and a second actuator position in which the second actuator structure is spaced apart from the first actuator structure along the movement axis by a second distance that is greater than the first distance, each of the linkages comprising a link member, a pivot link, a first guide member and a second guide member, the link member being coupled to one of the first and second actuator structures, the pivot link having a first end, which is pivotably coupled to the link member, and a second end that is opposite the first end, the first guide member being coupled to the pivot link, the second guide member being coupled to the other one of the first and second actuator structures and cooperating with the first guide member to guide motion of the second end of the pivot link in a guide track defined by one or both of the first and second guide members, wherein the linkages cooperate with the biasing spring to releasably lock the second actuator structure in each of the first and second actuator positions.

2. The vehicle driveline component of claim 1, wherein the linear motor comprises an electromagnet coil and an armature.

3. The vehicle driveline component of claim 1, wherein the biasing spring comprises a plurality of helical coil springs that are circumferentially spaced about the movement axis.

4. The vehicle driveline component of claim 1, further comprising a clutch having a first clutch member and a second clutch member, the first clutch member being movable along the movement axis between a first clutch position and a second clutch position, wherein placement of the second actuator structure in one of the first and second actuator positions locates the first clutch member in the first clutch position to operate the clutch in a first mode that does not transmit rotary power there through, and wherein placement of the second actuator structure in the other one of the first and second actuator positions locates the first clutch member in the second clutch position to operate the clutch in a second mode that transmits rotary power there through.

5. The vehicle driveline component of claim 4, wherein the clutch is a dog clutch.

6. The vehicle driveline component of claim 4, further comprising a differential assembly, the differential assembly having a differential input that is rotatable about the movement axis.

7. The vehicle driveline component of claim 6, further comprising a shaft, wherein the differential assembly comprises a differential output, and wherein the clutch is configured to selectively couple the differential output to the shaft for rotation therewith.

8. The vehicle driveline component of claim 7, wherein the clutch is disposed within the differential input.

9. The vehicle driveline component of claim 7, wherein the differential assembly comprises a differential gearset and wherein the differential output is a gear in the differential gearset.

10. The vehicle driveline component of claim 9, wherein the gear is a side gear.

11. The vehicle driveline component of claim 7, further comprising a plurality of pins that are disposed axially between the differential output and the second actuator structure, the pins extending axially through the differential input.

12. A vehicle driveline component comprising:
an actuator having a first actuator structure, a second actuator structure, a biasing spring, a linear motor and a plurality of linkages, the second actuator structure being movable relative to the first actuator structure along a movement axis, the biasing spring biasing the second actuator structure away from the first actuator structure along the movement axis, the linear motor being selectively operable to urge the second actuator structure toward the first actuator structure, the plurality of linkages coupling the second actuator structure to the first actuator structure for movement of the second actuator structure relative to the first actuator structure between a first actuator position, in which the second actuator structure is spaced apart from the first actuator structure along the movement axis by a first distance, and a second actuator position in which the second actuator structure is spaced apart from the first actuator structure along the movement axis by a second distance that is greater than the first distance, wherein the linkages cooperate with the biasing spring to releasably lock the second actuator structure in each of the first and second actuator positions; and
wherein each of the linkages comprises a fixed link, a pivot link, a link guide track and a guide member, the fixed link being fixedly coupled to one of the first and second actuator structures, the pivot link having a first end, which is pivotally coupled to the fixed link, and a second end, the link guide track being fixedly coupled to the other one of the first and second actuator structures, the guide member being mounted to the second end of the pivot link and engaging the link guide track.

13. The vehicle driveline component of claim 12, wherein the guide member comprises a pin.

14. The vehicle driveline component of claim 12, wherein each of the fixed links is fixedly coupled to the second actuator structure.

15. The vehicle driveline component of claim 12, further comprising a clutch having a first clutch member and a second clutch member, the first clutch member being movable along the movement axis between a first clutch position and a second clutch position, wherein placement of the second actuator structure in one of the first and second actuator positions locates the first clutch member in the first clutch position to operate the clutch in a first mode that does not transmit rotary power there through, and wherein placement of the second actuator structure in the other one of the first and second actuator positions locates the first clutch member in the second clutch position to operate the clutch in a second mode that transmits rotary power there through.

16. The vehicle driveline component of claim 15, wherein the clutch is a dog clutch.

17. The vehicle driveline component of claim 15, further comprising a differential assembly, the differential assembly having a differential input that is rotatable about the movement axis.

18. The vehicle driveline component of claim 17, further comprising a shaft, wherein the differential assembly comprises a differential output, and wherein the clutch is configured to selectively couple the differential output to the shaft for rotation therewith.

19. The vehicle driveline component of claim 18, wherein the clutch is disposed within the differential input.

20. The vehicle driveline component of claim 18, wherein the differential assembly comprises a differential gearset and wherein the differential output is a gear in the differential gearset.

\* \* \* \* \*